(12) United States Patent
Pal (10) Patent No.: US 10,108,634 B1
(45) Date of Patent: Oct. 23, 2018

(54) IDENTIFICATION AND REMOVAL OF DUPLICATE EVENT RECORDS FROM A SECURITY INFORMATION AND EVENT MANAGEMENT DATABASE

(71) Applicant: EMC Corporation, Hopkinton, MA (US)

(72) Inventor: Susam Pal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 318 days.

(21) Appl. No.: 15/078,375

(22) Filed: Mar. 23, 2016

(51) Int. Cl.
*G06F 17/00* (2006.01)
*G06F 17/30* (2006.01)
*H04L 29/06* (2006.01)

(52) U.S. Cl.
CPC .. *G06F 17/30156* (2013.01); *G06F 17/30312* (2013.01); *G06F 17/30371* (2013.01); *H04L 63/20* (2013.01)

(58) Field of Classification Search
None
See application file for complete search history.

(56) References Cited

U.S. PATENT DOCUMENTS

| 7,945,935 | B2 * | 5/2011 | Stonedahl | G06Q 30/0601 386/223 |
| 7,949,662 | B2 * | 5/2011 | Farber | G06F 17/30091 707/698 |
| 8,370,882 | B2 * | 2/2013 | Stonedahl | G06Q 30/0601 386/223 |
| 2004/0003005 | A1 * | 1/2004 | Chaudhuri | G06F 17/30303 |
| 2004/0139097 | A1 * | 7/2004 | Farber | G06F 17/30091 |
| 2012/0272283 | A1 * | 10/2012 | McCarthy | H04N 21/2743 725/134 |
| 2014/0298114 | A1 * | 10/2014 | Aoki | G06F 11/2028 714/48 |
| 2016/0220139 | A1 * | 8/2016 | Mahajan | A61B 5/7282 |
| 2016/0248803 | A1 * | 8/2016 | O'Connell | G06F 17/30528 |

(Continued)

OTHER PUBLICATIONS

RSA, The Security Division of EMC, "RSA enVision Platform: Security Overview," RSA Security, Inc., 2007, 2 pages.

(Continued)

*Primary Examiner* — Hung D Le
(74) *Attorney, Agent, or Firm* — Ryan, Mason & Lewis, LLP (57) ABSTRACT

A method comprises receiving information characterizing events from respective ones of a plurality of network devices each comprising one or more event sources, storing event records in a security information and event management database with each event record corresponding to a given event and comprising a device identifier, an event source name, an event time and an event record number, obtaining a set of event records from the security information and event management database for a specified network device in a specified time range, identifying whether respective ones of the event records in the set are duplicate event records based at least in part on mappings of event time and event record number values to ordered pairs of device identifier and event source name values, and removing event records in the set identified as duplicate event records from the security information and event management database.

20 Claims, 5 Drawing Sheets

(56) References Cited

U.S. PATENT DOCUMENTS

2016/0306871 A1* 10/2016 Chauhan ........... G06F 17/30601
2017/0046407 A1* 2/2017 Palmert .......... G06Q 10/063114

OTHER PUBLICATIONS

RSA, The Security Division of EMC, "IPDB and the IPDB Extractor Service Overview," http://sadocs.emc.com/0_en-us/095_10.3_User_Guide/13_Device_and_Service_Configuration/IPDB_Extractor_Service_Configuration_Guide/01_IPDB_Extractor, Mar. 23, 2016, 1 page.
RSA, The Security Division of EMC, "RSA enVision LogSmart Internet Protocol Database," RSA Solution Brief, 8 pages.

* cited by examiner

IDENTIFICATION AND REMOVAL OF DUPLICATE EVENT RECORDS FROM A SECURITY INFORMATION AND EVENT MANAGEMENT DATABASE

FIELD

The field relates generally to information processing, and more particularly to storage in information processing systems.

BACKGROUND

A Security Information and Event Management (STEM) system may collect information from monitored applications or network devices in an enterprise environment or other type of information processing system. The SIEM system may use the collected information to build a database of enterprise activity in an STEM database, with the information stored in the STEM database being utilized for performing various analytics relating to the enterprise environment. As enterprise environments increase in size, the management of STEM databases becomes an increasingly costly and complex task.

SUMMARY

Illustrative embodiments of the present invention provide techniques for the identification and removal of duplicate event records from an STEM database. Such techniques in some embodiments advantageously permit for such identification and removal, or deduplication, to be performed in linear time with constant storage space. In addition, such techniques in some embodiments allow for deduplication of event records from multiple network devices to be run simultaneously or otherwise in parallel with one another. Accordingly, a network security system such as an SIEM system can exhibit improved performance.

In one embodiment, a method comprises receiving information characterizing one or more events from respective ones of a plurality of network devices, each network device comprising one or more event sources, storing one or more event records in a security information and event management database, each event record corresponding to a given one of the events and comprising a device identifier, an event source name, an event time and an event record number, obtaining a set of event records from the security information and event management database for a specified one of the network devices in a specified time range, identifying whether respective ones of the event records in the set are duplicate event records based at least in part on mappings of event time and event record number values to ordered pairs of device identifier and event source name values, and removing event records in the set identified as duplicate event records from the security information and event management database. The method is performed by at least one processing device comprising a processor coupled to a memory, the at least one processing device being connected to the plurality of network devices and the security information and event management database over at least one network.

The processing device may be implemented, for example, in one or more network devices in a computer network, in a security operations center of an enterprise, in a security information and event management system, or in a security analytics system or other type of network security system associated with the computer network or an enterprise.

These and other illustrative embodiments include, without limitation, methods, apparatus, networks, systems and processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
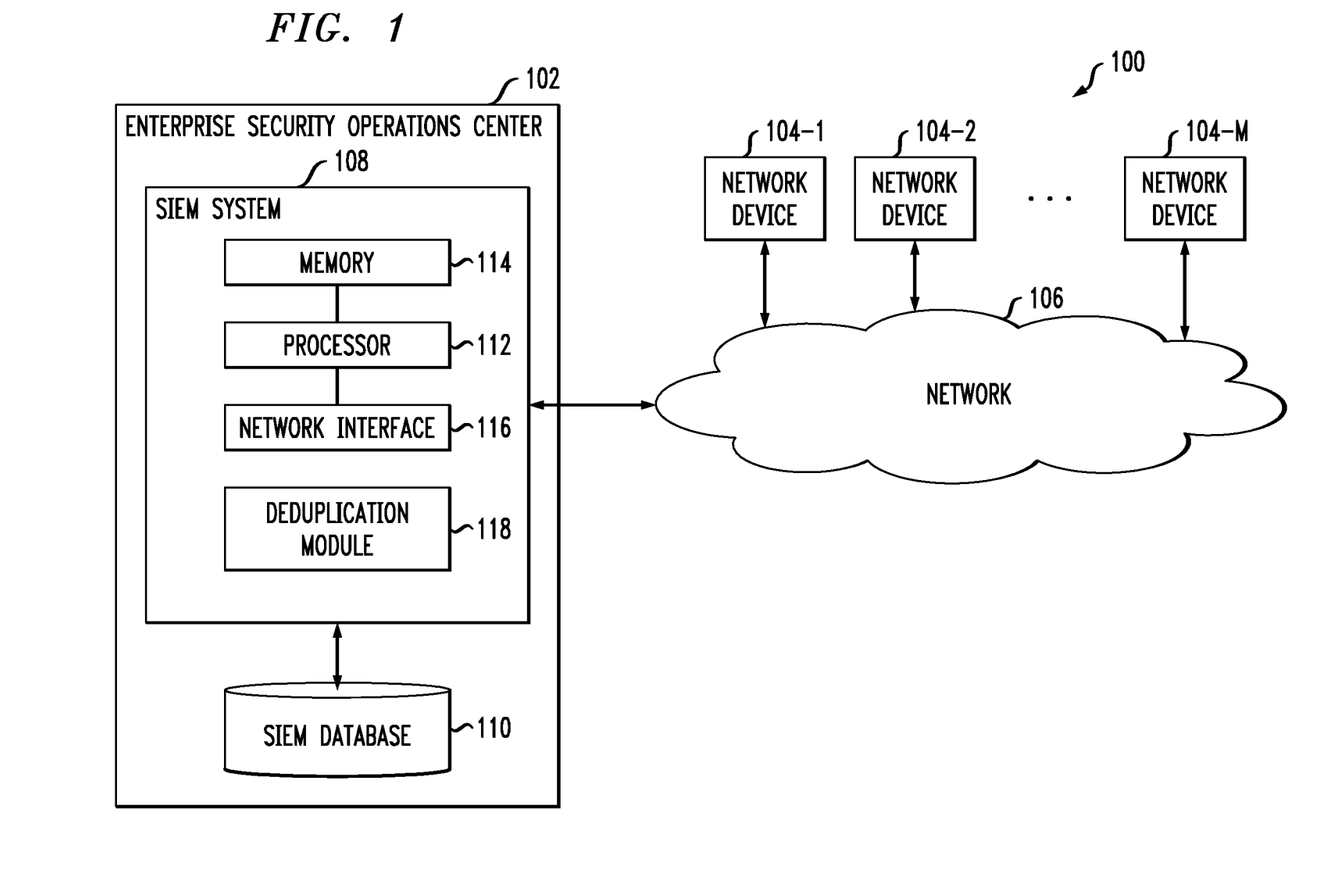
FIG. 1 is a block diagram of an information processing system for identifying and removing duplicate event records in an illustrative embodiment of the invention.

FIG. 1 shows a computer network 100 configured in accordance with an illustrative embodiment of the invention. The computer network 100 comprises an enterprise security operations center (SOC) 102 and a plurality of network devices 104-1, 104-2, . . . 104-M, collectively referred to herein as network devices 104. The network devices 104 are coupled to a network 106, where the network 106 in this embodiment is assumed to represent a sub-network or other related portion of the larger computer network 100. Accordingly, elements 100 and 106 are both referred to herein as examples of "networks" but the latter is assumed to be a component of the former in the context of the FIG. 1 embodiment.

The network devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The network devices 104 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 106 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The enterprise SOC 102 has an STEM system 108 and SIEM database 110. While the SIEM database 110 is shown in FIG. 1 as being external to the SIEM system 108, in other embodiments the STEM database 110 may be internal to the SIEM system 108. The SIEM database 110 may alternately be external to both the enterprise SOC 102 and SIEM system 108, such as being connected to the enterprise SOC 102 and/or SIEM system 108 over network 106.

The STEM database 110 in some embodiments is implemented using one or more storage devices associated with the enterprise SOC 102. Such storage devices may comprise, for example, VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. A variety of other storage products may be utilized to implement at least a portion of the storage devices associated with the enterprise SOC 102, including combinations of multiple ones of these and other storage products.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, the SOC 102 may provide monitoring and control functions for information technology (IT) infrastructure, including network devices 104. For example, the SIEM system 108 of enterprise SOC 102 may generate alerts or notifications to, or permit queries of STEM database 110 from, network device 104, a system administrator, information technology (IT) manager, or other authorized personnel via one or more security agents. Such security agents may be implemented via the network devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the STEM system 108. For example, a given security agent may comprise a mobile telephone equipped with a mobile application configured to receive alerts or notifications from the enterprise SOC 102 or the STEM system 108, and to provide an interface for the security agent to select particular remedial measures for responding to the alert or notification. The given security agent may additionally or alternatively provide an interface for querying the STEM system 108 and/or SIEM database 110.

It should be noted that a "security agent" as the term is generally used herein may comprise an automated entity, such as a software entity running on a processing device. Accordingly, a security agent need not be a human entity.

As shown in FIG. 1, the enterprise SOC 102 comprises SIEM system 108. Various elements of SOC 102, including the STEM system 108, may be implemented at least in part using one or more processing platforms including public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in an embodiment of the invention is the VMware® vSphere™ which may include an associated management system such as vCenter™. The STEM system 108 may be a centralized STEM, or a distributed STEM system wherein certain functionality of the STEM system 108 is distributed via remote components injected or otherwise implemented by applications running on servers or other types of IT infrastructure including but not limited to network devices 104.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRack™ or Vblock® converged infrastructure commercially available from VCE, the Virtual Computing Environment Company, an EMC Federation Company.

Although shown as an element of the enterprise SOC 102 in this embodiment, the STEM system 108 in other embodiments can be implemented at least in part externally to the enterprise SOC 102, for example, as a stand-alone server, set of servers or other type of system coupled to the network 106. In some embodiments, the STEM system 108 may be a distributed STEM system implemented at least in part within one or more of the network devices 104.

The SIEM system 108 in the FIG. 1 embodiment is assumed to be implemented using at least one processing device. Each such processing device generally comprises at least one processor and an associated memory, and implements one or more functional modules for controlling certain features of the STEM system 108.

More particularly, the STEM system 108 in this embodiment comprises a processor 112 coupled to a memory 114 and a network interface 116.

The processor 112 illustratively comprises a microprocessor, a microcontroller, an application-specific integrated circuit (ASIC), a field-programmable gate array (FPGA) or other type of processing circuitry, as well as portions or combinations of such circuitry elements.

The memory 114 illustratively comprises random access memory (RAM), read-only memory (ROM) or other types of memory, in any combination. The memory 114 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 116 allows the SIEM system 108 to communicate over the network 106 with the network devices 104, and illustratively comprises one or more conventional transceivers.

The processor 112 of STEM system 108 further implements a deduplication module 118. The deduplication module 118 is configured to receive information characterizing one or more events from respective ones of network devices 104, with each network device 104 comprising one or more event sources. The deduplication module is also configured to store one or more event records in STEM database 110 with each event record corresponding to a given one of the events and comprising a device identifier, an event source name, an event time and an event record number. The deduplication module 118 is further configured to obtain a set of event records from the STEM database 110 for a specified one of the network devices 104 in a specified time range, to identify whether respective ones of the event records in the set are duplicate event records based at least in part on mappings of event time and event record number values to ordered pairs of device identifier and event source name values, and to remove event records in the set identified as duplicate event records from the STEM database 110. Additional details regarding the deduplication module 118 will be described in further detail below with respect to FIGS. 2-5.

Event records are referred to herein as duplicate or non-duplicate. Duplicate event records refer to "bad" events, while non-duplicate event records refer to "good" events. Consider, as an example, events from a particular event source denoted R1, R2, R3, etc. and that a network device including the event source reports events in the following order: (1) R1, (2) R2, (3) R3, (4) R1, (5) R2, (6) R3, (7) R4, (8) R5, (9) R3, (10) R4 and (11) R5. In this example, each of the events is duplicated: event R1 is reported twice at (1) and (4); event R2 is reported twice at (2) and (5); event R3 is reported three times at (3), (6) and (9); event R4 is reported twice at (7) and (10); and event R5 is reported twice at (8) and (11). The first copy or first report of each event is a "good" or non-duplicate event: (1) for R1; (2) for R2; (3) for R3; (7) for R4; and (8) for R5. The other copies or reports of these events are "bad" or duplicate events: (4), (5), (6), (9), (10) and (11).

It is to be appreciated that multiple copies or reports of an event need not be identical. For example, a duplicate event record is not necessarily an exact copy of its corresponding non-duplicate event record. In some embodiments, minor variations between duplicate and non-duplicate event records may be contemplated. For example, a duplicate event record may utilize a first device identifier value where its corresponding non-duplicate event record utilizes a second device identifier value, where both the first identifier value and the second identifier value point to the same network device, e.g., the first device identifier value is an IP address of a given network device while the second device identifier value is a hostname of the given network device. Some embodiments may be designed so as to correctly identify duplicate event records even accounting for such variations in device identifier values, or variations in event source name values, event time values, event record number values or other event information characterizing a given event.

It is to be appreciated that the particular arrangement of the enterprise SOC 102, SIEM system 108 and deduplication module 118 illustrated in the FIG. 1 embodiment is presented by way of example only, and alternative arrangements can be used in other embodiments. As discussed above, for example, the enterprise SOC 102, STEM system 108 and/or deduplication module 118 may in some embodiments be implemented internal to one or more of the network devices 104. As another example, the functionality associated with the deduplication module 118 can be separated across multiple modules possibly implemented with multiple distinct processors. The deduplication module 118 may also be implemented by one or more processing devices external to one or both of the STEM system 108 and the enterprise SOC 102.

At least portions of the deduplication module 118 may be implemented at least in part in the form of software that is stored in memory 114 and executed by processor 112.

It is to be understood that the particular set of elements shown in FIG. 1 for identification and removal of duplicate event records from STEM database 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the SIEM system 108 may be implemented external to enterprise SOC 102, such that the enterprise SOC 102 can be eliminated.

In some embodiments, the STEM system 108 may be part of or otherwise associated with a system other than the enterprise SOC 102, such as, for example, a critical incident response center (CIRC).

Additionally or alternatively, the STEM system 108 can be part of or incorporate an otherwise conventional security analytics system, such as the RSA Security Analytics system commercially available from RSA, The Security Division of EMC Corporation of Hopkinton, Mass.

In some embodiments, the STEM system 108 is implemented as part of or in conjunction with the enVision® platform, also commercially available from RSA.

Figure 2:
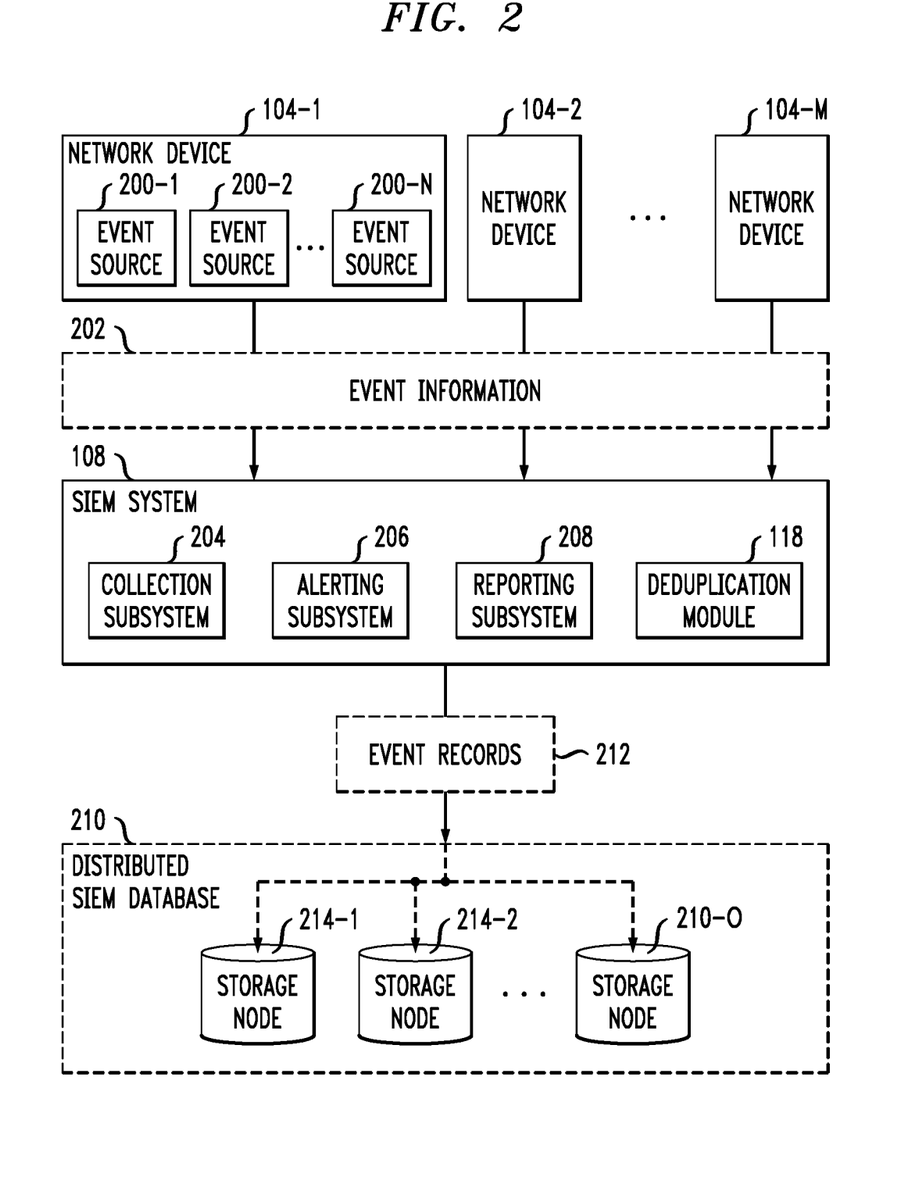
FIG. 2 is a detailed view of portions of the FIG. 1 system in an illustrative embodiment.

In the SIEM domain, STEM technology such as SIEM system 108 may be used to collect event information from one or more of the network devices 104 in network 100, and to store the event information in SIEM database 110. FIG. 2 shows a detailed view of portions of the network 100 in which the STEM database 110 is implemented as a distributed STEM database 210. As shown in FIG. 2, network device 104-1 includes a plurality of event sources 200-1, 200-2, . . . 200-N, collectively referred to as event sources 200. Although not explicitly shown in FIG. 2, other ones of the network devices 104 may also include one or more event sources. The network devices 104 provide event information 202 to the SIEM system 108, shown in FIG. 2 as including a collection subsystem 204, alerting subsystem 206, reporting subsystem 208 and deduplication module 118. Although not explicitly shown in FIG. 2 for clarity, the SIEM system 108 may contain various other subsystems and components, such as a query engine, a visualization subsystem, or other components of a commercially available SIEM system such as the enVision® platform from RSA.

The SIEM system 108 provides the event information to distributed SIEM database 210 for storage as one or more event records 212. The distributed SIEM database 210 uses storage nodes 214-1, 214-2, . . . 214-0 for storing and indexing the event records 212.

The collection subsystem 204 may implement collectors or collector agents. Each collector or collector agent may collect event information from one or more devices addressable by Internet Protocol (IP) addresses. The collectors or collector agents may be implemented at least in part internal to the network devices 104 or event sources within or otherwise associated with network devices 104. In some embodiments, the network 100 may include a computer network of thousands of Microsoft® Windows devices, where each Windows device contains several event sources such as Application, Security, System, etc. Another example is a computer network of Linux devices where each Linux device contains several log files generated by computing processes. It is to be appreciated, however, that embodiments are not limited solely to use with computer networks including Windows devices or Linux devices but are instead more generally applicable for use with various other types of devices, including computer networks with a combination of Windows, Linux and other types of devices.

The collection subsystem 204 may check a list, table or other record of generated events in each of the network devices 104. Such checks may be performed periodically at regular intervals, in response to user requests, etc. When new events are found, event information is collected by the collection subsystem 204 and stored in the distributed SIEM 210. In order to ensure that only new events are collected and that events that have been collected earlier but are still present on the network devices 104 are ignored, the collection subsystem 204 can maintain bookmark information to keep track of the most recent event that has been collected from each event source. Thus, the collection subsystem 204 can identify new events that have not been collected when checking the event sources and network devices 104 for new events.

In some instances, however, duplicate events may be collected by the collection subsystem 204. For example, two or more collectors or collector agents may collect events from the same event source. As another example, the bookmark information may become corrupted causing a collector or collector agent to re-collect events that have already been collected. In these and other situations, duplicate event records may be stored in the distributed STEM database 210.

Duplicate event records may negatively impact the performance of various functions of the SIEM system 108, as well as wasting resources in the distributed SIEM database 210. For example, duplicate event records can fill the distributed SIEM database 210, thus negatively impacting the performance of queries made on the distributed STEM database 210 by the reporting subsystem 208 of the STEM system 108. Duplicate event records may also lead to duplicate and redundant results to queries made on the distributed STEM database, preventing a user of STEM system 108 from focusing on distinct and meaningful results. Duplicate event records can also exhaust the storage space available in distributed STEM database 210. Depending on the number of network devices 104 and the activity in the network 100, the total volume of event records generated and stored in distributed SIEM database 210 can vary from a few terabytes to a few hundred terabytes. As such, efficient techniques are required for removing duplicate event records in such a large scale.

Methods for deduplicating data can use one of two options: (1) linear time and linear space; or (2) linearithmic time and constant space. Deduplicating event records in an STEM database such as STEM database 110 or distributed STEM database 210 using option (1) requires additional storage space that grows linearly with the total number of event records to be processed for deduplication. In an SIEM database with several terabytes of event records, it is infeasible or impractical to allocate an additional amount of space that grows linearly with the total number of events to be processed for deduplication. Deduplicating event records using option (2) requires significantly more time than deduplicating event records with linear time, and may require shuffling the order of event records in the SIEM database which is not feasible or practical to perform without causing storage input-output contention on a live SIEM system.

Embodiments provide enhanced techniques for managing data in an SIEM system such as SIEM system 108. Some embodiments provide for deduplication of event records in an SIEM database such as STEM database 110 or distributed STEM database 210 with methods that use linear time and constant storage space, and can also be used to deduplicate event records from multiple network devices and event sources simultaneously or in parallel. As such, some embodiments ensure that deduplication of event records can be performed in a reasonable amount of time without exceeding a fixed amount of storage allocated for deduplication.

In some embodiments, the time consumed to deduplicate event records, or to identify and remove duplicate event records from an STEM database such as STEM database 110 or distributed SIEM database 210, grows linearly with the total number of event records to be processed for deduplication, i.e., O(n) time. The total storage space, such as RAM or disk space required to deduplicate event records, is independent of the total number of event records to be processed for deduplication and does not exceed a constant upper bound, i.e., O(1) time. The deduplication of event records from different network devices and event sources can run simultaneously or in parallel with one another.

A stream of events from a network device such as network device 104-1 with event sources 200 may include text or binary data pertaining to one or more events. The stream of events can be stored and indexed in distributed STEM database 210 as event records. There may be multiple streams of events from multiple ones of the network devices 104. Therefore, events from multiple streams from multiple ones of the network devices 104 may be stored and indexed as event records in the distributed STEM database 210. In some instances, the streams of events may include security logs. Embodiments, however, are not restricted for use with any particular type of data but instead can work with any arbitrary type of SIEM data including, by way of example, logs which are not security logs, data that is not in the form of logs, etc.

In some embodiments, deduplication of event records in linear time and constant space requires that event records stored in an SIEM database such as STEM database 110 or distributed SIEM database 210 are stored such that an event record for a chronologically first event belonging to a specified one of network devices 104 within any specified time range can be accessed in constant time, and event records for all subsequent events for the specified network device and time range can be accessed in linear time with respect to the number of event records that are present in the STEM database for the specified network device and time range. In some implementations, this is ensured through the use of a hierarchical graph of containers in the STEM database.

A hierarchical graph of containers in the SIEM database may be arranged such that containers at the lowest level of the hierarchy contain event records, and the containers at other levels of the hierarchy contain other containers. Each container may be implemented, for example, as a directory on a filesystem of the STEM database, as an archive file in the directory, as a data file in the directory or in the archive file, or as a section in a data file where the data file comprises a header defining an index with locations of the beginnings of each section in the data file.

Figure 3:
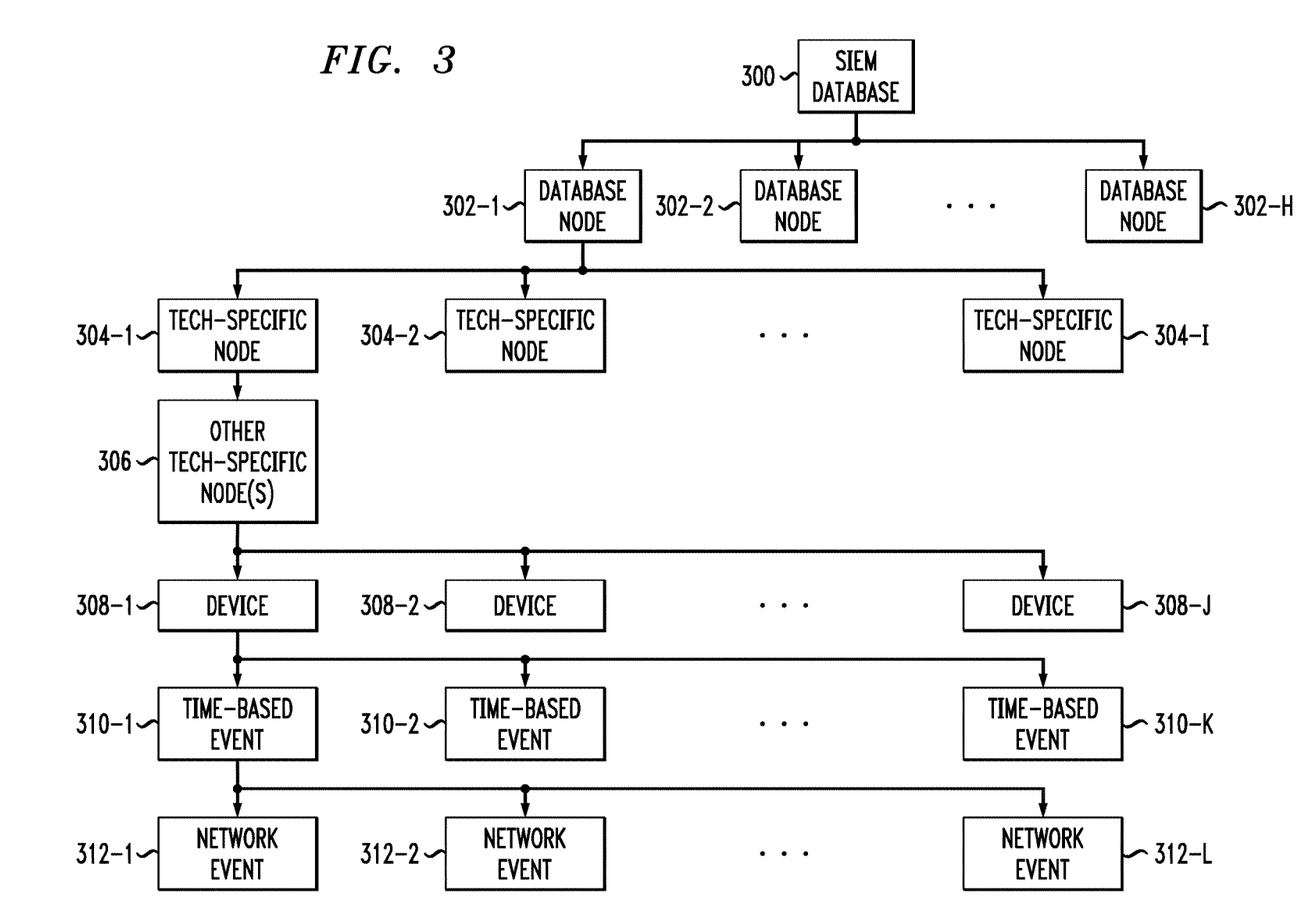
FIG. 3 shows an example container hierarchy in an illustrative embodiment.

FIG. 3 illustrates an example container hierarchy ensuring that the event record for the chronologically first event belonging to the specified network device and time range can be accessed in constant time and that event records for all subsequent events for the specified network device and time range can be accessed in linear time with respect to the number of event records present in the STEM database for the specified network device and time range. The FIG. 3 hierarchy has, at the highest level, the STEM database container 300. The STEM database container 300 contains database node containers 302-1, 302-2, . . . 302-H, collectively referred to herein as database node containers 302. Each of the database node containers 302 may correspond to one of the storage nodes of a distributed STEM database, such as storage nodes 214 of distributed SIEM database 210.

The database node container 302-1 contains technology-specific node containers 304-1, 304-2, . . . 304-I, collectively referred to herein as technology-specific node containers 304. The technology-specific node containers 304 may represent SIEM technology-specific details such as, by way of example, collection technology identifiers, database names, etc. While not explicitly shown for clarity, other ones of the database node containers 302 may also contain a number of technology-specific node containers. As shown in FIG. 3, the technology-specific node container 304-1 contains another technology-specific node container 306. The technology-specific node containers 304-1 and 306 maybe of different types. Again, although not explicitly shown in FIG. 3, other ones of the technology-specific node containers 304 may also contain one or more other technology-specific node containers.

The technology-specific node container at the lowest level of a particular branch of the hierarchy, which in the FIG. 3 example is technology-specific node container 306, contains device containers 308-1, 308-2, . . . 308-J, collectively referred to herein as device containers 308. The different device containers 308 may correspond to respective ones of the network devices 104. Device container 308-1 contains time-based event containers 310-1, 310-2, . . . 310-K, collectively referred to herein as time-based event containers 310. Time-based event container 310-1 contains network event containers 312-1, 312-2, . . . 312-L, collectively referred to herein as network event containers 312. Although not explicitly shown for clarity, branches from other ones of the technology-specific node containers 304, device containers 308 and time-based event containers 310 may contain other nodes. In addition, although not explicitly shown each of the network event containers 312 may contain other containers, such as timestamp containers, record number containers or other types of containers for different event attributes or information. It is also important to note that the specific container hierarchy shown in FIG. 3 is presented by way of example, and that embodiments are not limited solely to user with the FIG. 3 container hierarchy.

In the FIG. 3 container hierarchy, the device containers 308 implicitly index network events by device identifiers. Device identifiers may be, by way of example, a hostname or IP address. Time-based event containers 310 implicitly index events by time. In some embodiments, each time-based event container represents a fixed length of time, such as a second, minute, hour, day, week, etc. depending on the granularity of time range used to run deduplication. Each time-based event container 310 contains event records or other information for events that occur in the duration of time represented by that container. In a typical large-scale computer network, maintaining time-based event containers for every minute of the day when events are collected is an efficient approach. Embodiments, however, may utilize various other time ranges for time-based event containers depending on the specifics and desired performance for a particular implementation.

Event records stored in an SIEM database such as SIEM database 110 or distributed SIEM database 210 include at least the following information: a device identifier d, an event source name s, an event time t and an event record number n. The device identifier d may be, by way of example, an IP address, hostname or other information that identifies a particular one of network devices 104 that an event belongs to. The event source name s identifies the event source within or associated with the network device that the event belongs to. The event time t identifies the time of the event, and the event record number n identifies the record number of the event. The use of event time t and event record number n assists in deduplicating event records even when record numbers are reset. For example if a user associated with a network device deletes all records of the network device such that the record number is reset to 0 or 1, deduplication based solely on the device identifier d, event source name s and record number n may mistakenly identify non-duplicate event records as duplicates or mis-identify a duplicate event record as non-duplicate.

Event information 202 collected by collection subsystem 204 of STEM system 108 typically includes the four pieces of information d, s, t and n for each event. Thus, event records for such events stored in an STEM database such as STEM database 110 or distributed STEM database 210 will include d, s, t and n automatically. Thus, to obtain d, s, t and n, the event record stored in the SIEM database is parsed. In cases where the event information 202 is incomplete or missing one or more of d, s, t and n for a given event, the SIEM system 108 may append or embed the missing information when storing the event records in the SIEM database. The SIEM system 108 may store this information as metadata implicitly via a container hierarchy such as the container hierarchy shown in FIG. 3. The information or metadata for different events may also be stored by the SIEM system 108 separately in the STEM database or other storage. The STEM system 108 therefore ensures that d, s, t and n may be extracted from an event record or otherwise obtained for each event.

For each event source, the event record number n for non-duplicate events increments as a function of event time. As an example, the event record number n may be represented as a non-negative integer that is a strictly increasing function of event time. The record numbers for different event sources are independent of one another. For various event sources, the event record number n may be reset to an initial value such as 0 or 1. As an example, an administrator or other authorized user may manually reset an event source such that all existing events on the event source are removed and the record number is reset to its initial value.

An exemplary process for identifying and removing duplicate event records, also referred to herein as deduplication, will now be described in more detail with reference to the flow diagram of FIG. 4. It is to be understood that this particular process is only an example, and that additional or alternative processes for deduplication can be carried out in other embodiments.

Figure 4:
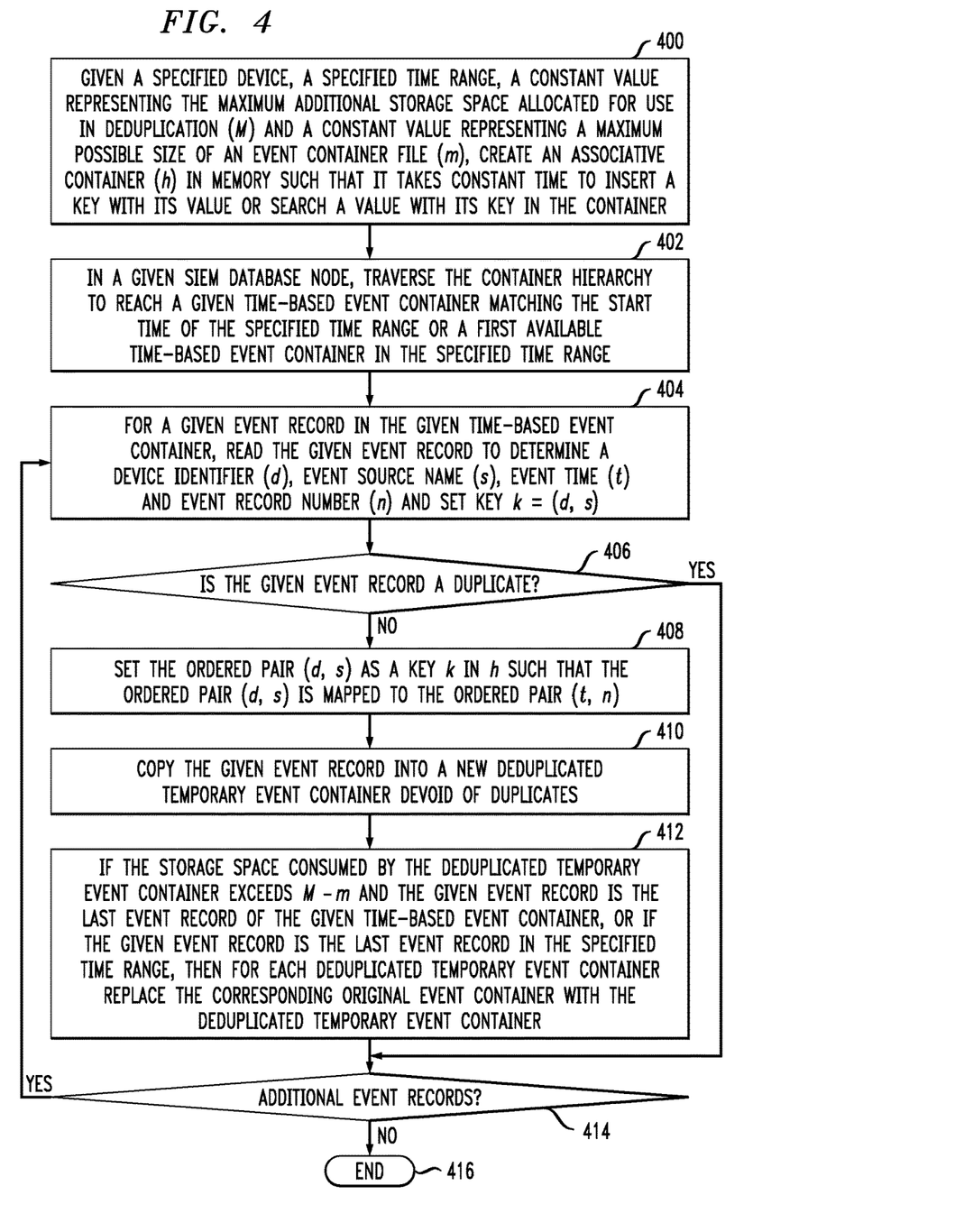
FIG. 4 is a flow diagram of an exemplary process for identifying and removing duplicate event records in an illustrative embodiment.

The deduplication process of FIG. 4 may be performed independent of the collection of event information by the SIEM system 108. In addition, multiple instances of the FIG.

4 process may be run independently of one another as separate processes on the same computing device or on separate computing nodes. The FIG. 4 process reads event information from event records for a specified device and a specified time range one by one and determines whether each event record is a good event (a non-duplicate record) or a bad event (a duplicate record). The FIG. 4 process makes use of an associative container, which may take the form of a hash table, which maps ordered pairs of device identifiers and event source names to ordered pairs of event time and event record numbers. The event time and event record number for a current event record are compared with the maximum event time and maximum event record number maintained in the associative container for the device identifier and event source name of the current event record to determine if the current event record is a duplicate event record. The use of ordered pairs of device identifier and event source name is useful in preventing key collisions as will be discussed in further detail below.

In this embodiment, the process includes steps 400 through 416. These steps are assumed to be performed by the processor 112 of the SIEM system 108 utilizing deduplication module 118. The process begins with step 400, where given a specified device, a specified time range, a constant value M representing the maximum additional storage space allocated for use in deduplication and a constant value m representing a maximum possible size of an event container file, an associative container h is created in memory such that it takes constant time to insert a key k with its value or to search a value with its key k in the container. In some embodiments, the value M is at least twice the value of m. It is important to note that the use of M in this context is different than the use of M to denote the number of network devices 104 in FIGS. 1 and 2.

In step 402, a given SIEM database node is selected and traversed to reach a given time-based event container matching the start time of the specified time range or a first available time-based event container in the specified time range. Step 402 is performed for each SIEM database node, and is done in constant time because the total number of SIEM database nodes and the total depth of the container hierarchy are fixed.

The process continues with step 404, where, for a given event record in the given time-based event container, the given event record is read so as to determine the device identifier d for the given event, the event source name s for the given event, the event time t for the given event and the event record number n for the given event. Also in step 404, the value of a key k for the given event is set to k=(d, s). As will be explained in further detail below, step 404 may be repeated for additional event records in the given time-based event container. Setting the key k to (d, s) provides various advantages relative to using a concatenation of d and s. For example, a concatenation of d and s is prone to key collision problems. Consider a first event record having a device identifier "ServerA" and an event source name "Log" and a second event record having a device identifier "Server" and an event source name "ALog." If the device identifiers and event source names were concatenated, then there would be a key collision for the first event record and the second event record. Using ordered pairs of device identifiers and event source names avoids such key collisions.

In step 406, a determination is made as to whether the given event record is a duplicate event record. Step 406 may more particular involve checking whether the associate container h contains a key k for the ordered pair (d, s). If the container h contains k, there are two conditions in which the given event record is determined to be a duplicate event record: (1) if the value of t in the given event record is less than h[k].t; or (2) if the value of t in the given event record is the same as h[k].t and the value of n for the given event record is less than or equal to h[k].n. The values h[k].t and h[k].n represent "known" event times and record numbers.

The known event time h[k].t is the latest event time in the associative container h for the ordered pair (d, s), while the known record number h[k].n is the highest record number in the associative container h for the ordered pair (d, s). The associative container h may contain multiple known event times and known record numbers. Consider, as an example, an associative container with the following entries: (device1, eventsource1) set to (July 12 10:30:02, 1001) and (device1, eventsource2) set to (July 12 10:40:02, 9912). If the ordered pair (d, s) is (device1, eventsource1), then the known event time is July 12 10:30:02 and the known record number is 1001. If the ordered pair (d, s) is (device1, eventsource2), then the known event time is July 12 10:40:02 and the known record number is 9912.

If the container h contains k and one of the conditions (1) and (2) are met, then the given event record is determined to be a duplicate event record in step 406. In this case, the process continues to step 414 to check whether there are additional event records to process in the given time-based event container or specified time range.

If the container h does not contain k or if h contains k but neither condition (1) nor condition (2) is met, then the given event record is determined to be a non-duplicate event record in step 406. In this case, the process proceeds to step 408, where the value for the key k=(d, s) in the container h is updated to the ordered pair (t, n), where t and n are the event time and event record number for the given event record. Thus, the "known" event time and "known" event record number for the ordered pair (d, s) in the container h are updated in step 408.

In step 410, the given event record is copied into a new deduplicated temporary event container that is devoid of duplicate event records. The deduplicated temporary event container eventually replaces the given event container file, the original event container file, by processing in step 412. In step 412, for each deduplicated temporary event container the corresponding original event container is replaced with its deduplicated temporary event container. Step 412 may further involve performing post processing, such as indexing and publishing the replaced event containers as live for usage in the STEM system 108. The processing in step 412 occurs if either of the following conditions is met: (1) the storage space consumed by the deduplicated temporary event container exceeds M−m and the given event record is the last event record of the given time-based event container; or (2) the given event record is the last event record in the specified time range.

The process continues with step 414, checking for additional event records to be processed in the given time-based event container or specified time range. If the result of step 414 is yes, the process loops back to step 404. Otherwise, the process ends in step 416. The FIG. 4 process allows for deduplication to be performed such that the time required for identifying and removing duplicate event records from an SIEM database increases linearly with a total number of event records but where the storage space required for identifying and removing duplicate event records from the STEM database does not exceed a specified upper bound. Thus, embodiments can perform deduplication with limited storage space M, where a user can specify the value of M.

While the FIG. 4 process was described for deduplicating events in an SIEM database for a single specified network device and time range, multiple instances of the FIG. 4 process may be run simultaneously or concurrently for different specified network devices and time ranges. Thus, deduplication processing can be parallelized.

Another exemplary process for deduplication will now be described in detail with reference to the flow diagram of FIG. 5. It is to be understood that this particular process is only an example, and that additional or alternative processes for deduplication can be carried out in other embodiments.

In this embodiment, the process includes steps 500 through 508. These steps are assumed to be performed by the processor 112 of SIEM system 108 utilizing deduplication module 118. The process begins with step 500, receiving information characterizing one or more events from respective ones of a plurality of network devices such as network devices 104 with each network device comprising one or more event sources. In some embodiments, step 500 includes receiving one or more streams of event information from respective ones of the plurality of network devices with each stream of event information comprising text and/or binary data relating to events.

In step 502, one or more event records are stored in an SIEM database such as SIEM database 110 or distributed SIEM database 210. Each event record corresponds to a given one of the events, and comprises a device identifier, an event source name, an event time and an event record number. The record numbers for non-duplicate events in the set of event records increment as a function of event time. Record numbers, however, may be reset to an initial value as discussed above. The record numbers for events occurring after the reset still increment as a function of time, but the event records stored in the SIEM database for such subsequent events may have lower or smaller record numbers than earlier-in-time events for a particular event source and network device.

In some embodiments, storing the event records in step 502 involves storing the event records in the SIEM database such that an event record for a chronologically first event associated with the specified network device in the specified time range can be accessed in constant time and event records for all subsequent events associated with the specified network device in the specified time range can be accessed in linear time with respect to a total number of event records in the SIEM database for the specified network device in the specified time range. This may be accomplished by utilizing a container hierarchy with respective containers indexing events by device identifier and event time. Containers in the hierarchy may include, for example, a directory on a filesystem of the SIEM database, an archive file in the directory, a data file in the directory, a data file in an archive file, or a section in a data file, where the data file comprises a header defining an index with locations of a beginning of each section.

Received event information, in some cases, may be missing some or all of the device identifier, event source name, event time and event record number. The SIEM system 108 in step 502 may append or embed such missing information in the event records stored in the STEM database. This embedding may be done implicitly based on storage of the event records in a container hierarchy utilized by the STEM database.

Figure 5:
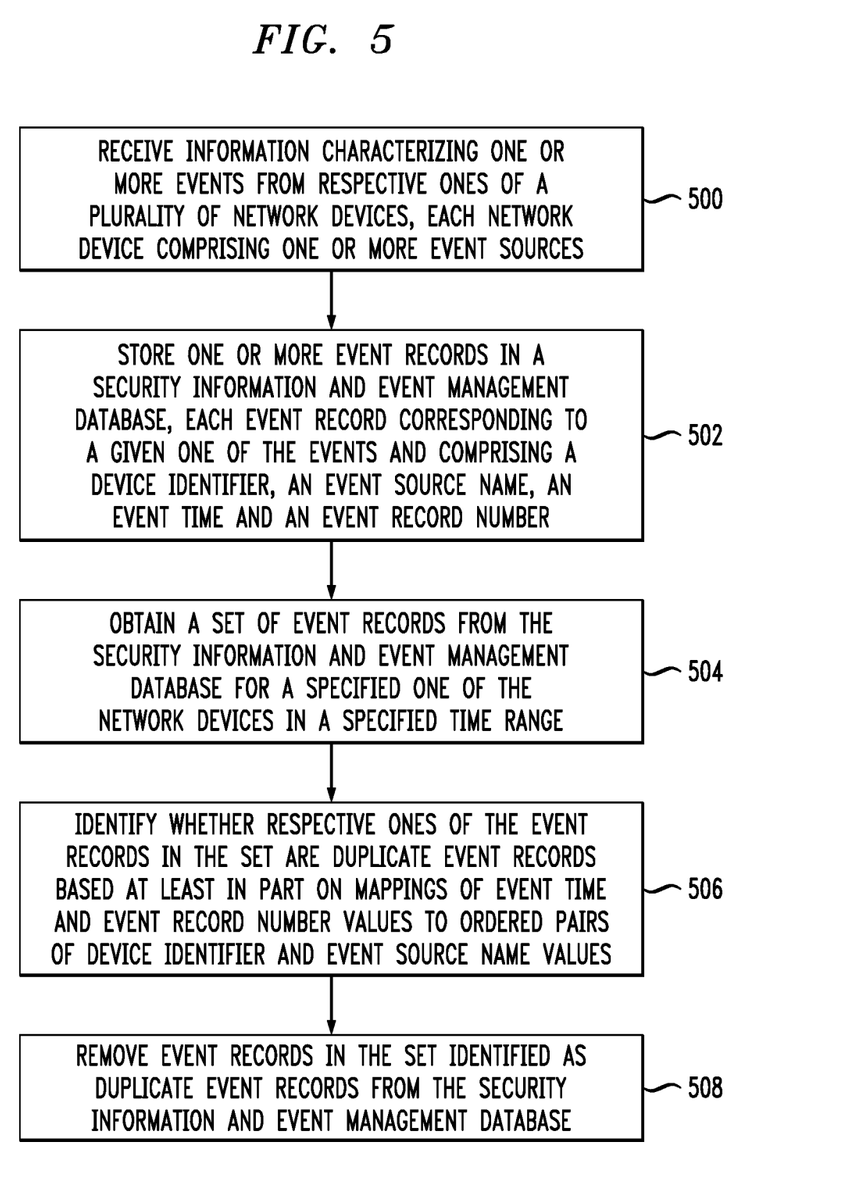
FIG. 5 is a flow diagram of another exemplary process for identifying and removing duplicate event records in an illustrative embodiment.

Steps 500 and 502 of the FIG. 5 process reflect collection and management of event information by the STEM system 108. The remaining steps 504, 506 and 508 reflect deduplication. Similar to the FIG. 4 process, multiple instances of steps 504, 506 and 508 of the FIG. 5 process may be performed in parallel for multiple network devices and time ranges.

The process continues with step 504, obtaining a set of event records from the SIEM database for a specified network device in a specified time range. Obtaining the set of event records from the SIEM database for the specified network device in the specified time range may include traversing the container hierarchy of the STEM database to identify a given time-based event container matching a start time of the specified time range or a first available time-based event container in the specified time range.

In step 506, the SIEM system 108 identifies whether respective ones of the event records in the set are duplicate event records based at least in part on mappings of event time and event record number values to ordered pairs of device identifier and event source name values. The mappings of event time and event record number values to ordered pairs of device identifier and event source name values are stored in an associative container comprising a hash table. In some embodiments, the mappings include mappings between ordered pairs of device identifier and event source name values and corresponding ordered pairs of event time and event record number values. In other embodiments, multiple associative containers may be used, such that a first associative container maps ordered pairs of device identifier and event source name values to event time values and a second associative container maps ordered pairs of device identifier and event source name values to event record number values.

Step 506 may include identifying a given event record as a duplicate event record by comparing the event time for the given event record to a known event time and comparing the record number of the given event record to a known record number, where the known event time comprises a maximum event time for the ordered pair of device identifier and event source name values in previously-obtained event records for the specified network device in the specified time range and the known record number comprises a maximum record number for the ordered pair of device identifier and event source name values in previously-obtained event records for the specified network device in the specified time range.

More particularly, step 506 may include reading the given event record to identify d, s, t and n for a given event associated with the given event record. The given event record is determined to be a duplicate event record if an associative container h contains a mapping of a key k=(d, s) to an ordered pair of a known event time and a known record number and at least one of the following conditions is met: (1) t is less than the known event time for key k; and (2) t is equal to the known event time for key k and n is less than or equal to the known record number for key k. Otherwise, the given event record is determined not to be a duplicate event record.

In step 508, event records in the set identified as duplicate event records are removed from the STEM database. Removing the event records identified as duplicate event records may include, for a given event record determined not to be a duplicate event record, performing the processing described below. The value of key k for the given event record in the associative container h is set to the ordered pair (t, n) for the given event record, where t is an updated known event time for key k and n is an updated known record number for key k. The given event record is also copied to a deduplicated temporary event container file. An original event container file for the given event record stored in the STEM database is replaced with the deduplicated temporary event container file responsive to at least one of the following conditions. The first condition is determining that the given event record is a last event in the original event container file and that the storage space consumed by the deduplicated temporary event container file exceeds M−m, where M and m are defined as discussed above in conjunction with FIG. 3—m represents an upper bound on storage space of an event container file, M represents an upper bound on storage space allocated for deduplication of event records, and M≥2m. The second condition is determining that the event record is a last event record for the specified network device in the specified time range.

Step 508 may further include taking remedial action responsive to identifying duplicate event records. For example, if it is discovered that a particular network device or event source is causing more than a specified threshold of duplicate event records, an alert or notification may be generated in the STEM system 108. The alert or notification may be transmitted to one or more of the network device 104, or to an administrator or other user of the SIEM system to investigate the cause. The alerts of notifications may be transmitted via the aforementioned security agents. Remedial action may also include, for example, the STEM system 108 checking the configuration of the collection subsystem 204 to ensure that multiple collection agents are not mistakenly collecting event information from the same event source. The SIEM system 108 may alternately check for suspicious or frequent record number resets, and either disable record number resets by particular users or provide warnings to users before permitting record number resets. Various other remedial actions may be taken in other embodiments.

Embodiments described herein provide a number of advantages. For example, some embodiments provide for deduplication to be performed in linear time with constant storage space, and also allow for parallelization of deduplication processes for multiple network devices and time ranges.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, notifications, alerts and other features can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
receiving information characterizing one or more events from respective ones of a plurality of network devices, each network device comprising one or more event sources;
storing one or more event records in a security information and event management database, each event record corresponding to a given one of the events and comprising a device identifier, an event source name, an event time and an event record number;
obtaining a set of event records from the security information and event management database for a specified one of the network devices in a specified time range;
identifying whether respective ones of the event records in the set are duplicate event records based at least in part on mappings of event time and event record number values to ordered pairs of device identifier and event source name values; and
removing event records in the set identified as duplicate event records from the security information and event management database;
wherein the method is performed by at least one processing device comprising a processor coupled to a memory, the at least one processing device being connected to the plurality of network devices and the security information and event management database over at least one network.

2. The method of claim 1 wherein:
a time required for identifying whether respective ones of the event records in the set are duplicate event records and removing the event records in the set identified as duplicate event records increases linearly with a total number of event records in the set; and
storage space required for identifying whether respective ones of the event records in the set are duplicate event records and removing the event records in the set identified as duplicate event records is independent of the total number of event records in the set and does not exceed a specified upper bound.

3. The method of claim 1 wherein receiving information characterizing one or more events from respective ones of the plurality of network devices comprises receiving multiple streams of event information from respective ones of the plurality of network devices, each stream of event information comprising at least one of text and binary data relating to one or more events.

4. The method of claim 1 wherein the record numbers for non-duplicate events in the set of event records increment as a function of event time and wherein record numbers for an event source may be reset to an initial value.

5. The method of claim 1 wherein storing the one or more event records in the security information and event management database comprises storing the event records such that an event record for a chronologically first event associated with the specified network device in the specified time range can be accessed in constant time and event records for all subsequent events associated with the specified network device in the specified time range can be accessed in linear time with respect to a total number of event records in the security information and event management database for the specified network device in the specified time range.

6. The method of claim 1 wherein storing the one or more event records in the security information and event management database comprises utilizing a container hierarchy with respective containers indexing events by device identifier and event time, each container in the container hierarchy being implemented as one of:
a directory on a filesystem of the security information and event management database;
an archive file in the directory;
a data file in the directory or the archive file;
a section in the data file, wherein the data file comprises a header defining an index with locations of a beginning of each section.

7. The method of claim 1 wherein storing the one or more event records in the security information and event management database comprises:

reading the received information characterizing the one or more events to identify device identifiers, event source names, event times and event record numbers for respective ones of the events; and embedding device identifiers, event source names, event times and record numbers for respective events in the event records.

8. The method of claim 7 wherein embedding device identifiers, event source names, event times and record numbers for respective events in the event records comprises implicitly embedding the device identifiers, event source names, event times and record numbers based on storage of the event records in a container hierarchy utilized by the security information and event management database.

9. The method of claim 1 wherein the mappings of event time and event record number values to ordered pairs of device identifier and event source name values are stored in an associative container comprising a hash table.

10. The method of claim 1 wherein the mappings of event time and event record number values to ordered pairs of device identifier and event source name values comprise mappings between:
a first set of ordered pairs of device identifier and event source name values; and
a second set of ordered pairs of event time and event record number values.

11. The method of claim 1 wherein:
identifying whether respective ones of the event records in the set are duplicate event records comprises identifying a given event record as a duplicate event record by comparing the event time for the given event record to a known event time and comparing the record number of the given event record to a known record number;
the known event time comprises a maximum event time for the ordered pair of device identifier and event source name values of the given event record in previously-obtained event records for the specified network device in the specified time range; and
the known record number comprises a maximum record number for the ordered pair of device identifier and event source name values of the given event record in previously-obtained event records for the specified network device in the specified time range.

12. The method of claim 1 wherein obtaining the set of event records from the security information and event management database for the specified network device in the specified time range comprises traversing a container hierarchy of the security information and event management database to identify a given time-based event container matching a start time of the specified time range or a first available time-based event container in the specified time range.

13. The method of claim 12 wherein identifying whether respective ones of the event records in the set are duplicate event records comprises, for a given event record in the set of event records:
reading the given event record to identify d, s, t and n for a given event associated with the given event record, where d is the device identifier for the given event, s is the event source name for the given event, t is the event time for the given event and n is the record number for the given event;
determining that the given event record is a duplicate event record if an associative container h contains a mapping of a key k=(d, s) to an ordered pair of a known event time and a known record number and at least one of:
t is less than the known event time for key k; and
t is equal to the known event time for key k and n is less than or equal to the known record number for key k; and
otherwise determining that the given event record is not a duplicate event record.

14. The method of claim 13 wherein removing event records in the set identified as duplicate event records comprises, for the given event record determined not to be a duplicate event record:
setting the value of key k for the given event record in the associative container h to the ordered pair (t, n) for the given event record, where t is an updated known event time for key k and n is an updated known record number for key k;
copying the given event record to a deduplicated temporary event container file; and
replacing an original event container file stored in the security information and event management database with the deduplicated temporary event container file responsive to at least one of:
determining that the given event record is a last event in the original event container file and that the storage space consumed by the deduplicated temporary event container file exceeds M−m, where m represents an upper bound on storage space of an event container file, M represents an upper bound on storage space allocated for deduplication of event records, and M≥2m; and
determining that the event record is a last event for the specified network device in the specified time range.

15. The method of claim 1 further comprising, in parallel with identifying whether respective ones of the event records in the set are duplicate event records, identifying whether respective ones of event records in one or more other sets of event records for other specified network devices and specified time ranges are duplicate event records.

16. A computer program product comprising a non-transitory processor-readable storage medium having stored therein program code of one or more software programs, wherein the program code when executed by at least one processing device cause the at least one processing device:
to receive information characterizing one or more events from respective ones of a plurality of network devices, each network device comprising one or more event sources;
to store one or more event records in a security information and event management database, each event record corresponding to a given one of the events and comprising a device identifier, an event source name, an event time and an event record number;
to obtain a set of event records from the security information and event management database for a specified one of the network devices in a specified time range;
to identify whether respective ones of the event records in the set are duplicate event records based at least in part on mappings of event time and event record number values to ordered pairs of device identifier and event source name values; and
to remove event records in the set identified as duplicate event records from the security information and event management database.

17. The computer program product of claim 16 wherein:

a time required for identifying whether respective ones of the event records in the set are duplicate event records and removing the event records in the set identified as duplicate event records increases linearly with a total number of event records in the set; and storage space required for identifying whether respective ones of the event records in the set are duplicate event records and removing the event records in the set identified as duplicate event records is independent of the total number of event records in the set and does not exceed a specified upper bound.

18. An apparatus comprising:

at least one processing device comprising a processor coupled to a memory and implementing a security information and event management system;

the security information and event management system being configured:

to receive information characterizing one or more events from respective ones of a plurality of network devices, each network device comprising one or more event sources;

to store one or more event records in a security information and event management database, each event record corresponding to a given one of the events and comprising a device identifier, an event source name, an event time and an event record number;

to obtain a set of event records from the security information and event management database for a specified one of the network devices in a specified time range;

to identify whether respective ones of the event records in the set are duplicate event records based at least in part on mappings of event time and event record number values to ordered pairs of device identifier and event source name values; and to remove event records in the set identified as duplicate event records from the security information and event management database.

19. The apparatus of claim 18 wherein the security information and event management database comprises a distributed security information and event management database comprising two or more storage nodes connected over at least one network.

20. The apparatus of claim 19 wherein:

a time required for identifying whether respective ones of the event records in the set are duplicate event records and removing the event records in the set identified as duplicate event records increases linearly with a total number of event records in the set; and storage space required for identifying whether respective ones of the event records in the set are duplicate event records and removing the event records in the set identified as duplicate event records is independent of the total number of event records in the set and does not exceed a specified upper bound.

* * * * *

UNITED STATES PATENT AND TRADEMARK OFFICE
CERTIFICATE OF CORRECTION

PATENT NO. : 10,108,634 B1  
APPLICATION NO. : 15/078375  
DATED : October 23, 2018  
INVENTOR(S) : Susam Pal Page 1 of 4

It is certified that error appears in the above-identified patent and that said Letters Patent is hereby corrected as shown below:

In the Specification

Column 1, Line 14 please delete "(STEM)" and replace it with --(SIEM)--

Column 1, Line 19 please delete "STEM" and replace it with --SIEM--

Column 1, Line 20 please delete "STEM" and replace it with --SIEM--

Column 1, Line 23 please delete "STEM" and replace it with --SIEM--

Column 1, Line 30 please delete "STEM" and replace it with --SIEM--

Column 3, Line 7 please delete "STEM" and replace it with --SIEM--

Column 3, Line 10 please delete "STEM" and replace it with --SIEM--

Column 3, Line 15 please delete "STEM" and replace it with --SIEM--

Column 3, Line 41 please delete "STEM" and replace it with --SIEM--

Column 3, Line 52 please delete "STEM" and replace it with --SIEM--

Column 3, Line 56 please delete "STEM" and replace it with --SIEM--

Column 3, Line 60 please delete "STEM" and replace it with --SIEM--

Column 4, Line 1 please delete "STEM" and replace it with --SIEM--

Column 4, Line 10 please delete "STEM" and replace it with --SIEM--

Signed and Sealed this  
Twenty-seventh Day of November, 2018

Andrei Iancu  
*Director of the United States Patent and Trademark Office*

CERTIFICATE OF CORRECTION (continued)
U.S. Pat. No. 10,108,634 B1

Column 4, Line 11 please delete both occurrences of "STEM" and replace them with --SIEM--

Column 4, Line 12 please delete "STEM" and replace it with --SIEM--

Column 4, Line 33 please delete "STEM" and replace it with --SIEM--

Column 4, Line 38 please delete "STEM" and replace it with --SIEM--

Column 4, Line 39 please delete "STEM" and replace it with --SIEM--

Column 4, Line 46 please delete "STEM" and replace it with --SIEM--

Column 4, Line 47 please delete "STEM" and replace it with --SIEM--

Column 5, Line 8 please delete "STEM" and replace it with --SIEM--

Column 5, Line 14 please delete "STEM" and replace it with --SIEM--

Column 5, Line 19 please delete "STEM" and replace it with --SIEM--

Column 5, Line 26 please delete "STEM" and replace it with --SIEM--

Column 6, Line 4 please delete "STEM" and replace it with --SIEM--

Column 6, Line 12 please delete "STEM" and replace it with --SIEM--

Column 6, Line 19 please delete "STEM" and replace it with --SIEM--

Column 6, Line 28 please delete "STEM" and replace it with --SIEM--

Column 6, Line 32 please delete "STEM" and replace it with --SIEM--

Column 6, Line 37 please delete "STEM" and replace it with --SIEM--

Column 6, Line 40 please delete "STEM" and replace it with --SIEM--

Column 6, Line 45 please delete "STEM" and replace it with --SIEM--

Column 6, Line 46 please delete "STEM" and replace it with --SIEM--

Column 7, Line 39 please delete "STEM" and replace it with --SIEM--

Column 7, Line 45 please delete "STEM" and replace it with --SIEM--

Column 7, Line 46 please delete "STEM" and replace it with --SIEM--

CERTIFICATE OF CORRECTION (continued)
U.S. Pat. No. 10,108,634 B1

Column 7, Line 49 please delete "STEM" and replace it with --SIEM--

Column 7, Line 62 please delete "STEM" and replace it with --SIEM--

Column 7, Line 63 please delete "STEM" and replace it with --SIEM--

Column 8, Line 11 please delete "STEM" and replace it with --SIEM--

Column 8, Line 12 please delete "STEM" and replace it with --SIEM--

Column 8, Line 22 please delete "STEM" and replace it with --SIEM--

Column 8, Line 35 please delete "STEM" and replace it with --SIEM--

Column 8, Line 40 please delete "STEM" and replace it with --SIEM--

Column 8, Line 49 please delete "STEM" and replace it with --SIEM--

Column 8, Line 57 please delete "STEM" and replace it with --SIEM--

Column 8, Line 59 please delete "STEM" and replace it with --SIEM--

Column 8, Line 66 please delete "STEM" and replace it with --SIEM--

Column 9, Line 10 please delete "STEM" and replace it with --SIEM--

Column 9, Line 12 please delete "STEM" and replace it with --SIEM--

Column 9, Line 13 please delete "STEM" and replace it with --SIEM--

Column 9, Line 17 please delete "STEM" and replace it with --SIEM--

Column 10, Line 29 please delete "STEM" and replace it with --SIEM--

Column 10, Line 31 please delete "STEM" and replace it with --SIEM--

Column 10, Line 32 please delete "STEM" and replace it with --SIEM--

Column 10, Line 43 please delete "STEM" and replace it with --SIEM--

Column 10, Line 44 please delete "STEM" and replace it with --SIEM--

Column 12, Line 48 please delete "STEM" and replace it with --SIEM--

Column 12, Line 65 please delete "STEM" and replace it with --SIEM--

CERTIFICATE OF CORRECTION (continued)
U.S. Pat. No. 10,108,634 B1

Column 13, Line 60 please delete "STEM" and replace it with --SIEM--

Column 13, Line 62 please delete "STEM" and replace it with --SIEM--

Column 13, Line 65 please delete "STEM" and replace it with --SIEM--

Column 14, Line 9 please delete "STEM" and replace it with --SIEM--

Column 14, Line 56 please delete "STEM" and replace it with --SIEM--

Column 14, Line 67 please delete "STEM" and replace it with --SIEM--

Column 15, Line 19 please delete "STEM" and replace it with --SIEM--

Column 15, Line 24 please delete "STEM" and replace it with --SIEM--